April 27, 1937.   R. MONNIER   2,078,541

PROCESS FOR TEMPERING GLASS

Filed Jan. 9, 1935

INVENTOR:
Robert Monnier
BY
ATTORNEY

Patented Apr. 27, 1937

2,078,541

UNITED STATES PATENT OFFICE 2,078,541

PROCESS FOR TEMPERING GLASS

Robert Monnier, Paris, France, assignor to Societe Assurex le "Roi des Verres de Sécurité" Magnien, Monnier et Cie., a corporation of France and Leon, Alfred, Edouard Petit Application January 9, 1935, Serial No. 1,058
In France January 16, 1934

6 Claims. (Cl. 49—89)

The present invention relates to an improvement in processes for the tempering of sheets of plate glass or sheet glass in order to produce tempered sheets which do not possess any apparent deformations or unevennesses, while imparting to them to the maximum extent the usual qualities of tempered sheets of plate glass or sheet glass, namely, considerable strength, high elasticity and fracture into small pieces of regular dimensions.

Sheets of plate glass or sheet glass tempered according to the known processes certainly possess a greater strength than the sheets of plate glass or ordinary glass, and in addition possess the property of breaking into a large number of small pieces which are neither sharp-edged nor dangerous. These processes, however, involve a regular and uniform blowing over the entire surface to be treated so as to obtain a homogeneous and regular tempering. They have the disadvantage of giving rise to a network of tensions and compressions which, for the whole of the sheet, provide a certain general relative equilibrium, but this equilibrium is not to be found in any particular point of the sheet, so that the slightest force on the edges or any point of the sheet causes the said general equilibrium to be upset, thereby resulting in the total fracture of the glass.

In addition, according to the said processes, the tempered sheet of plate glass or sheet glass frequently exhibits deformations and irisations.

The deformations are due either to the violence of the air jets or to the particular progression of solidification, which produces an unequalized orientation of the general stresses of tension and compression, tending to deform the plate.

The irisations are due to the polarization of light by the tensioned or compressed portions of the sheet and are unavoidable but it is possible, by means of the tempering process according to the invention, to render them sufficiently small so that they will not be visible under normal conditions of use.

The present invention has for its object the elimination of the deformations and the diminishing of the irisations, as hereinbefore stated. In addition, it enables sheets to be produced which may be submitted to retouching or finishing on their edges after tempering without fear of the complete fracture of the sheet while securing a greater strength than that of the tempered sheets produced according to the known processes.

The invention consists in strictly imposing a law of progression of the solidification in the different portions of the surface of the sheet of plate glass or sheet glass, and in its thickness, so that the resultant of the tensions and compressions is not in any point large enough to produce deformations or irisations which are visible to the eye.

The essential feature of the invention, contrary to what has been the endeavour heretofore, is to produce adjacent partial tempering actions by producing a network of cooling points arranged according to equilateral triangles, the length of the side of which depends upon the thickness of the sheet of plate glass or sheet glass.

According to this process employing adjacent tempering actions, each of the faces is in equilibrium of compression and tension. This equilibrium exists in a large number of points of the sheet, and particularly at its edges, which enables them to be ground or rectified with a view to fitting, or the defects due to heating to be eliminated without upsetting the equilibrium of the whole.

For carrying out the invention, air nozzles are provided as indicated in the accompanying drawing, so that the jets at a given instant strike the sheet at points such as 1, 2, 3—or again 11, 12, 13—forming, as stated hereinbefore, equilateral triangles, the side of which has a definite length $l$ fixed by experience in regard to the mean thickness of the sheets of plate glass or sheet glass to be tempered.

By means of an appropriate device, which does not form part of the invention, either the sheet of plate glass or sheet glass is moved, or the support of the nozzles for the air jets, or both together or separately, so as to provide a relative movement of the sheet with respect to the jets, such that the traces of the jets on the sheet of glass form either circumferences of circles of a radius equal to $l$, (Figure 1), or broken lines each consisting of a horizontal straight line (for example, 16, 15, Fig. 2) followed by two inclined straight lines 15, 12 and 12, 14, forming between them at 12 an angle of 30°. This movement results in the traces of the jets being as shown in Fig. 2.

The nozzles of the jets of air cooling the other side of the plate are so arranged that, for that side, the traces of the air jets on the sheet are represented by the dotted lines.

Figure 1:
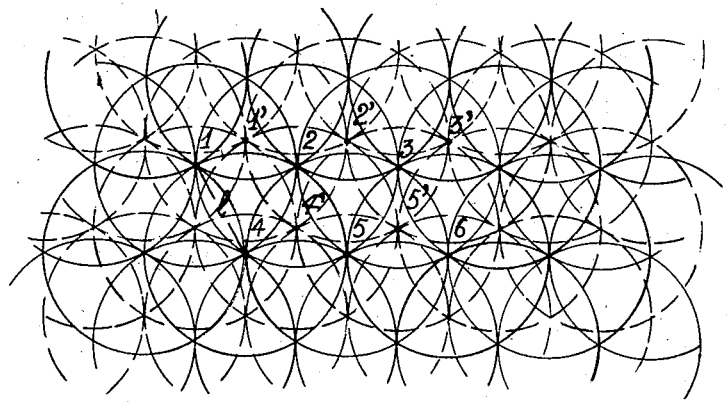
Figure 1 is a diagram illustrating the paths described by the air jets in tempering sheet glass according to one form of the present invention.
Figure 2:
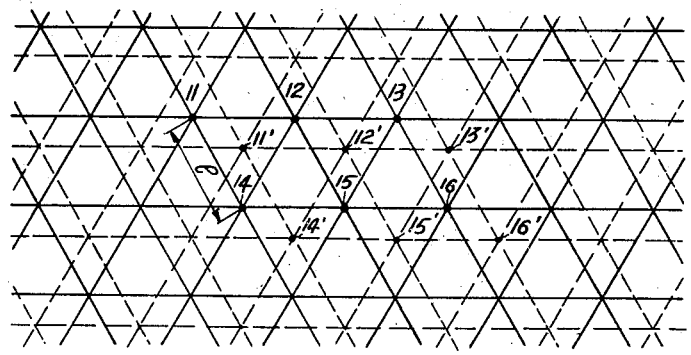
Fig. 2 is another diagram illustrating the paths described by the air jets in tempering glass according to another form of the present invention.

Both in regard to the arrangement shown in Figure 1 and also for that shown in Figure 2, the apices of the equilateral triangles formed on one side of the sheet of plate glass or sheet glass correspond to the centres of the equilateral triangles formed in the same way on the other side.

It will be seen:

(a) that the jets intersect at points on the surface of the sheet in which the rate of cooling is a maximum without being excessive, since the jets pass through these points without stopping therein;

(b) that following three directions at 120° to each other and intersecting in the above-mentioned points, the rate of cooling diminishes, then increases along these directions, passing from one point to the other;

(c) that the centres of the triangles are the portions which cool the least quickly, in the regions of the sheet where the deformations resulting from the cooling of the three sides of the triangle are composed along directions at 120° to each other which enables them, under the strains to equalize themselves without any of them having to undergo a considerable variation.

The points of intersection of the jets on one side of the sheet which correspond to the maximum rate of cooling are situated opposite the centres of the triangles formed by the intersection of the jets on the other side, which centres correspond to the minimum rate of cooling of these sides. At these points, the surfaces of propagation of the solidification are therefore slightly curved, which will enable the equilibrium of the tensions and compressions in those points to manifest itself in an imperceptible deformation of the sheet of glass perpendicularly to its plane, which will limit the resultant of the stresses in that zone.

Due to the relation provided between the arrangement of the air jets and the relative movement which is provided between the sheet to be tempered and the nozzles from which the air jets issue, there is therefore imposed a well-determined law of propagation of the solidification throughout the entire mass of the sheet of plate glass or sheet glass to be tempered, and the following results are obtained:

The tempered sheet of plate glass or sheet glass does not possess any deformation visible to the eye;

The irisations due to tempering are not visible to the eye and can only be detected under special conditions of illumination and observation.

The tempered sheets of plate glass or sheet glass do not possess any difference in appearance from non-tempered sheets of plate glass or sheet glass;

The differences between the maximum and minimum values of the tensions and compressions in the extent of the tempered sheet of plate glass or sheet glass being smaller, it is possible, without risk of prematurely fracturing the sheet, to increase the mean rate of cooling in order to obtain sheets having higher mechanical features after tempering.

I claim:

1. In the tempering of glass plates by means of movable air jets, the method which consists in displacing air jets grouped in equilateral triangular formation relatively to the glass plate so that the jets sweep the surface of the glass along predetermined paths and cool the same more intensively along zones disposed according to the sides of adjacent equilateral triangles and corresponding to said paths than in the areas included by said triangles between the said zones.

2. In the tempering of glass plates by means of movable air jets the method which consists in displacing air jets grouped in equilateral triangular formation relatively to the glass plate at both sides thereof so that the jets sweep the surface of the glass along predetermined paths and cool the same more intensively along zones corresponding to said paths and disposed according to the sides of adjacent equilateral triangles than in the areas included by said triangles between the said zones, and the apices of the equilateral triangles on one side of the glass plate projecting on the centers of the equilateral triangles on the other side of the plate.

3. In the tempering of glass plates by means of movable air jets, the method which consists in displacing air jets grouped in equilateral triangular formation relatively to the glass plate so that the jets sweep the surface of the glass along predetermined paths and cool the same more intensively along spindle-shaped zones disposed according to the sides of adjacent equilateral triangles and corresponding to said paths than in the areas of said triangles included between the said zones, the paths containing a circular component such that the zones are bounded by intersecting arcs of circles of radius equal to the length of sides of the equilateral triangles.

4. A method according to claim 2, in which the zones are spindle shaped and bounded by intersecting arcs of circles the radii of which are equal to the length of sides of the equilateral triangles.

5. In the tempering of glass plates by means of movable air jets, the method which consists in moving air jets grouped in equilateral triangular formation relatively to the glass plate in such a manner that the jets sweep the surface of the glass along predetermined paths and cool the same more intensively along zones corresponding to said paths and disposed according to the sides of adjacent equilateral triangles than in the areas included in the triangles between the zones, the zone-forming movement of each jet being along a path consisting of a straight base line, followed by a second straight line joined to the end thereof and forming an angle of 120° therewith, and a third straight line joined to the end of the second straight line, forming an angle of 60° therewith and being at an angle to the base line, said base line, second and third lines being of equal lengths.

6. A method according to claim 2, in which said zones are formed by a movement of each jet along a path consisting of a straight base line, followed by a second straight line joined to the end thereof and forming an angle of 120° therewith, and a third straight line joined to the end of the second straight line, forming an angle of 60° therewith and being at an angle to the base line, said base line, second and third lines being of equal lengths.

ROBERT MONNIER.